July 9, 1974 E. ANDRE ET AL 3,823,043
METHOD OF MANUFACTURING SEMICONDUCTOR BODY
Filed Dec. 20, 1971
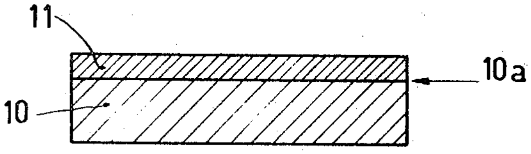
Fig. 1
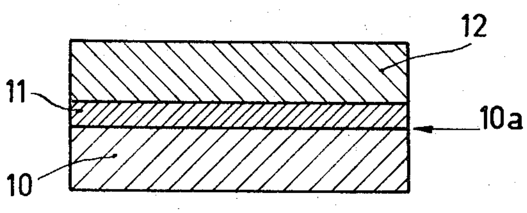
Fig. 2
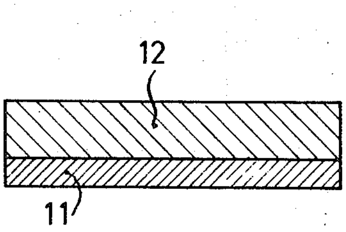
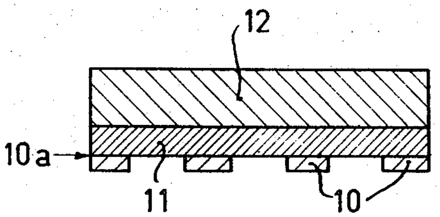
Fig. 3 Fig. 4
INVENTORS
BY ELIE ANDRE
MARC MAHIEU
AGENT

United States Patent Office 3,823,043

Patented July 9, 1974

3,823,043

METHOD OF MANUFACTURING SEMICONDUCTOR BODY

Elie Andre, Herouville, St.-Clair, and Marc Mahieu, Caen, France, assignors to U.S. Philips Corporation, New York, N.Y.

Filed Dec. 20, 1971, Ser. No. 209,763

Claims priority, application France, Dec. 23, 1970, 7046399, 7046400

Int. Cl. H01l 7/00

U.S. Cl. 148—171 6 Claims

ABSTRACT OF THE DISCLOSURE

A semiconductor body comprising a monocrystalline substrate which is covered with a monocrystalline ternary layer which consists of a metalloid of the fifth group of the Periodic system of Mendeleev and two metals of the third group of the same Periodic system.

The body is characterized in that the concentration in the ternary layer of the most reactive material of the two metals present is minimum near the interface with the substrate and increases in the direction of the surface of the ternary layer.

The invention relates to a method of manufacturing a monolithic semiconductor body which comprises at least a substrate of a monocrystalline semiconductor material and an active layer of a monocrystalline ternary compound which consists of an element of the fifth group of the Periodic system of Mendeleev and two elements of the third group of the said system, in which layer between the two elements of the third group, the atomic ratio between the element of which the atom has the smaller radius and the element of which the atom has the larger radius is minimum near the said substrate, increases in the direction of the thickness of the said ternary layer and becomes maximum at the surface of the said layer which is situated opposite to the said substrate.

It is known that the ternary crystals have a given number of particular physical properties which make them particularly interesting for industrial application, especially for the semiconductor industry, for example in the field of optic electronics. As far as at least the optic electronics are concerned, said properties are closely related to changes in the concentration of the components of the crystals in various points of their volume. It is known that such variations have an often regular character which is expressed by a continuous evolution of the ratio between the concentrations of the components present along the growth axes of the crystals. This is due to the fact that of two elements of the same group, the one having the stronger reactivity, i.e. the one of which the atom has the smaller radius, deposits first during a formation process of a crystal and that the concentration thereof regularly decreases when the thickness of the deposit increases.

It has been established in particular that during the epitaxial growing in the liquid phase of a ternary crystal of gallium arsenide and aluminium arsenide (Ga-Al-As) the aluminium of which the atom has a smaller radius than that of the gallium atom deposits comparatively more rapidly than the said gallium while the concentration of arsenic remains constant.

From this unequal but continuous distribution of the concentration along the growth axis of a ternary crystal it follows that certain physical properties of the said crystal are not equal along a chosen reference plane of said crystal. For example, the optical transmission cannot be the same in the direction of the growth axis or in the opposite direction.

It may hence be interesting for various applications and in particular for optic electronics to have the disposal of ternary crystals in which the concentration profiles of the components, from the substrates, are inverted relative to those which are obtained by epitaxy in the liquid phase of the said crystals.

In the "Journal of the Electrochemical Society" of March 1966 (volume 113, No. 3) a method is described of manufacturing gallium arsenide and aluminium arsenide crystals "by the epitaxial growing in an iodine vapour phase," which provides crystals in which the aluminium concentration increases from the substrate with the crystal deposit.

According to this method, iodine which is mixed with oxygen in a sealed bottle which contains on the one hand a source of aluminium arsenide or gallium arsenide powder or a mixture of the gallium arsenide powder and aluminium grains and contains on the other hand the substrates of gallium arsenide, ensures the transport from the source to the substrates and the epitaxial growing of the layer of Ga-Al-As.

This growth process in the vapour phase shows two important drawbacks.

First of all, the deposition is carried out at a very low speed: for example, a growth period is reported of 64 hours for forming a crystal layer the thickness of which lies near 260 micrometers.

On the other hand experience teaches that the results are difficult to reproduce and that the resulting layers lack homogeneity.

The method which forms the subject matter of the present invention and which uses the growing of a ternary crystal by epitaxy in the liquid phase enables the said drawback to be avoided.

The method of manufacturing a monolithic semiconductor body which comprises at least a substrate of a monocrystalline semiconductor material and an active layer of a monocrystalline ternary compound which consists of an element of the fifth group of the Periodic system of Mendeleev and two elements of the third group of the said Periodic system, in which layer between the two elements of the third group, the atomic ratio between the element the atom of which has the smaller radius and the element the atom of which has the larger radius is minimum near the said substrate, increases along the thickness of the said ternary layer and becomes maximum at the surface of the same layer opposite to the said substrate, is characterized in that the said active layer is first deposited by epitaxy from the liquid phase on a first face of a disc of monocrystalline semiconductor material and the said substrate is then deposited on said active layer, after which, from the second face of the disc which has remained free, the disc is removed.

Such a body is favourable for two reasons: on the one hand it enables the direct physical admission to the layer of ternary compound along the face thereof which corresponds to the first crystal deposit carried out during epitaxy which is the first object of the invention, on the other hand the body is mechanically rigid.

The body obtains mechanical rigidity from the substrate of semiconductor material which is deposited on the layer of the ternary compound. If the starting disc should be removed entirely without previously covering the ternary layer, the resulting device would have no practical use whatsoever since it lacks a sufficient mechanical coherence.

The structure according to the invention may be considered to be composed of various semiconductor materials in which the only problems are those of the coherence between the adjoining material and those of the possible contact connections to said materials. The said materials may be doped so that junctions are formed at the level present between the faces.

On the other hand, the starting semiconductor disc on the same structure may be selectively removed in such manner that several admission faces are formed on the ternary layer.

The substrate is preferably manufactured from a binary compound of an element of the fifth group of the Periodic system of Mendeleev and an element of the third group of the same Periodic system.

The disc is preferably manufactured from a binary compound of an element from the fifth group of the Periodic system of Mendeleev and an element of the third group of the same Periodic system.

The invention furthermore relates to an electroluminescent semiconductor body manufactured by means of the method and to an electroluminescent semiconductor device which comprises such a semiconductor body.

In order that the invention may be readily carried into effect, it will now be described in greater detail, by way of example, with reference to the accompanying drawing, in which:

FIGS. 1 to 3 are diagrammatic cross-sectional views of a semiconductor body according to the invention in three different phases of manufacture.

FIG. 4 also shows in the same manner a semiconductor body according to the invention in another possible embodiment.

It is to be noted that the dimensions in the drawing are not to scale for reasons of clarity.

Referring now to FIG. 1, a monocrystalline layer 11 of a ternary material is deposited on a disc 10 of a semiconductor material, said layer 11 comprising two elements of the third group of the Periodic system of Mendeleev and an element of the fifth group of the Periodic system.

The disc 10 is, for example, a binary compound III–V, for example gallium arsenide, and the layer 11 is of gallium arsenide and aluminium arsenide. The deposit of said latter body on gallium arsenide is carried out according to the method of epitaxy from the liquid phase.

Although the subject matter of the present invention is not essentially related to the adopted method of deposition, it is applied to remind briefly of the process normally used in the technology for deposition of gallium arsenide and aluminium arsenide by liquid epitaxy.

For example, in a crucible are placed on the one hand the disc to be covered and on the other hand aluminium arsenide and gallium arsenide crystals which comprise a certain proportion of aluminium (generally 0.3 to 0.8% by weight).

The crucible is placed in a furnace in which a temperature prevails in the order of 800° to 900° C. When the chosen temperature in the crucible is reached and the gallium arsenide and aluminium arsenide crystals have liquefied, the liquid and the substrate are contacted with each other. The temperature of the crucible is then very regularly decreased (in the order of 0.5 to 1° C. per minute) and during said cooling phase a monocrystalline rigid epitaxial layer of gallium arsenide and aluminium arsenide grows on the disc.

It is favourable to choose a crucible the shape of which corresponds to that described in French Pat. No. 1,600,341 which has two compartments which are separated by a movable partition which forms part of a control means present outside the crucible and by means of which the liquid aluminium arsenide and gallium arsenide can be contacted with each other by simply displacing the said partition without varying the position of the crucible in the furnace.

The physical conditions of the operation (concentration of aluminium crystals, temperature at which the disc and the liquid are contacted with each other, cooling rate, and so on . . .) may vary considerably according to the properties searched for the epitaxial deposition.

In agreement with what was said above as regards the respective reactivities of gallium and aluminium, in which one is lower than the other, the aluminium concentration regularly decreases in the direction of the thickness of the layer 11 from the interface 10*a* between the disc 10 and the said layer 11.

A substrate 12 of the same semiconductor material as that of the disc 10 or of a different material is then deposited on the layer 11, the choice depending upon the nature of the layer 11 and upon the adhering possibilities to said layer 11, as well as on the physical aim in view (see FIG. 2).

In the described case of a layer 11 of gallium arsenide and aluminium arsenide, the substrate 12 may be manufactured from a binary compound III–V, for example gallium arsenide, as for the disc 10, and the deposition may be carried out epitaxially.

Since the substrate 12 is to serve afterwards as a mechanical support for the construction, it should be given a thickness of preferably at least 100$\mu$. Since on the other hand the layer 11 has no mechanical function, the thickness thereof may be arbitrary, from a few microns to several tens of microns, dependent upon the requirements imposed upon the device thus manufactured.

The disc 10 is then removed partly or totally by mechanical grinding and/or chemical etching to finally obtain structures of the types which are shown in FIG. 3 (where the disc 10 is entirely removed) or 4 (where the disc has remained in various places with a given thickness and forms a surface layer). No matter to what extent the disc has been removed, the final structure is such that the layer 11 is directly admissible *via* the face which corresponds to the first crystal deposits obtained during epitaxy. Upon removing the disc, a part of the active layer may also be removed.

By suitable doping of the successively deposited matrials it is possible to obtain several semiconductor devices in known manner, in particular electroluminescent devices. A junction can be realized, for example, at the level of the interface between the layer 11 and the substrate 12 by giving the layer 11 *n*-type conductivity and giving the layer 12 *p*-type conductivity or conversely. This junction can also be obtained by diffusion of a suitable impurity in the layer 11 after depositing same and prior to covering with the substrate 12. A *p-n* junction may also be formed, after removing the disc, by diffusion of an impurity *via* the face of the active layer present opposite to the substrate.

On the other hand, the monocrystalline disc 10 and the substrate 12 may have either the same composition or a different composition and contain in both cases different or identical impurities of the same or of the opposite conductivity type.

The electroluminescent semiconductor device according to the invention is obtained by providing the semiconductor body with current conductors and, possibly an envelope.

What is claimed is:

1. A method of manufacturing a monolithic semiconductor body for an electroluminescent semiconductor device comprising the steps of:

epitaxially depositing from a melt known to be suitable therefor onto a surface of a suitable monocrystalline substrate a monocrystalline ternary layer composed of a first element from the fifth group of the Periodic system and second and third elements from the third group of the Periodic system, said second element having a smaller atomic radius than said third element and the atomic ratio of the second element to the third element decreasing in the ternary layer lattice as deposition proceeds;

depositing onto said ternary layer a second monocrystalline layer composed of an element from the third group of the Periodic system and an element from the fifth group of the Periodic system; and removing said monocrystalline substrate from at least a portion of said ternary layer.

2. The method of claim 1 wherein said substrate is entirely removed from said ternary layer.

3. The method of claim 1 wherein said substrate comprises an element from the third group of the Periodic system and an element from the fifth group of the Periodic system.

4. The method of claim 1 wherein said substrate comprises gallium arsenide.

5. The method of claim 1 wherein said second layer comprises gallium arsenide.

6. The method of claim 1 wherein said first, second and third elements respectively comprise arsenic, aluminum and gallium.

References Cited

UNITED STATES PATENTS

| | | | |
|---|---|---|---|
| 3,537,029 | 10/1970 | Kressel et al. | 148—171 UX |
| 3,370,980 | 2/1968 | Anderson | 117—201 X |
| 3,604,991 | 9/1971 | Yonezu et al. | 317—235 R |
| 3,677,836 | 7/1972 | Lorenz | 148—171 |
| 3,560,275 | 2/1971 | Keressel et al. | 148—171 |
| 3,560,276 | 2/1971 | Panish et al. | 148—171 |
| 3,687,743 | 8/1972 | Le Duc | 148—171 |

GEORGE T. OZAKI, Primary Examiner

U.S. Cl. X.R.

148—172, 173; 317—235; 252—62.3 GA